United States Patent
Nattar Ranganathan et al.

(10) Patent No.: US 12,284,028 B2
(45) Date of Patent: Apr. 22, 2025

(54) SIGNAL MASKING FOR SECURE BACKSCATTERED COMMUNICATION

(71) Applicant: Microsoft Technology Licensing, LLC, Redmond, WA (US)

(72) Inventors: Vaishnavi Nattar Ranganathan, Woodinville, WA (US); Nissanka Arachchige Bodhi Priyantha, Redmond, WA (US); Mike Nakahara, Kirkland, WA (US); Vikram Subramaniam Iyer, Seattle, WA (US); Harsh Sandesh Desai, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/303,124

(22) Filed: Apr. 19, 2023

(65) Prior Publication Data
US 2024/0356635 A1    Oct. 24, 2024

(51) Int. Cl.
*H04B 7/22*    (2006.01)
*H04B 1/18*    (2006.01)
(Continued)

(52) U.S. Cl.
CPC .................. *H04B 7/22* (2013.01); *H04B 1/18* (2013.01); *H04B 10/1149* (2013.01); *H04B 11/00* (2013.01); *H04B 13/00* (2013.01)

(58) Field of Classification Search
CPC ........ H04B 7/22; H04B 1/18; H04B 10/1149; H04B 11/00; H04B 13/00
See application file for complete search history.

(56) References Cited

U.S. PATENT DOCUMENTS

2005/0058292 A1    3/2005    Diorio et al.
2010/0026494 A1*   2/2010    Lees ..................... G06K 7/0008
                                                          340/572.1
(Continued)

FOREIGN PATENT DOCUMENTS

EP    1024626 A1    8/2000

OTHER PUBLICATIONS

"Dayton Audio DAEX25 Sound Exciter Pair", Retrieved From: https://web.archive.org/web/20220909202609/https://www.amazon.com/Dayton-Audio-DAEX25-Sound-Exciters/dp/B001EYEM8C, Sep. 9, 2022, 8 Pages.

(Continued)

*Primary Examiner* — Sam K Ahn
*Assistant Examiner* — Amneet Singh
(74) *Attorney, Agent, or Firm* — Alleman Hall & Tuttle LLP

(57) ABSTRACT

Examples are disclosed that relate to improving security of radio frequency (RF) backscattered communication. In one example, a RF device includes a primary RF signal receiver, a secondary signal receiver, a signal mixer, and a transmitter. The primary RF signal receiver is configured to receive a RF carrier signal sent from a base station. The secondary signal receiver is configured to receive a masking signal from the base station. The signal mixer is configured to generate a response signal based at least on the RF carrier signal and generate a mixed signal by mixing the response signal and the masking signal. The transmitter is configured to broadcast the mixed signal, via backscattering, as a masked backscattered signal.

17 Claims, 9 Drawing Sheets

(51) Int. Cl.
*H04B 10/114* (2013.01)
*H04B 11/00* (2006.01)
*H04B 13/00* (2006.01)

(56) References Cited

U.S. PATENT DOCUMENTS

2014/0232528 A1    8/2014   Han
2014/0349608 A1   11/2014  Li
2022/0385375 A1* 12/2022  Rekhi ...................... H04B 5/77
2023/0291535 A1*  9/2023  Wang ........................ H04L 5/14

OTHER PUBLICATIONS

"Keep Private Meetings Private", Retrieved From: https://web.archive.org/web/20150905161322/http://cambridgesound.com/conferenceroom/, Sep. 5, 2015, 5 Pages.

Chatterjee, et al., "ClearBuds: Wireless Binaural Earbuds for Learning-based Speech Enhancement", In repository of arXiv:2206.13611v1, Jun. 27, 2022, 14 Pages.

Ranganathan, et al., "RF Bandaid: A Fully-Analog and Passive Wireless Interface for Wearable Sensors", In Proceedings of the ACM on Interactive, Mobile, Wearable and Ubiquitous Technologies, vol. 2, Issue 2, Jul. 5, 2018, 21 Pages.

Xiao, et al., "Proximity-Based Security Using Ambient Radio Signals", In Proceedings of IEEE International Conference on Communications, Jun. 9, 2013, pp. 1609-1613.

International Search Report and Written Opinion received for PCT Application No. PCT/US2024/021256, mailed on Jul. 3, 2024, 12 pages.

\* cited by examiner

MASKING SIGNAL 400

MIXED SIGNAL 500

MIXED SIGNAL 700

SIGNAL MASKING FOR SECURE BACKSCATTERED COMMUNICATION

BACKGROUND

Radio frequency (RF) backscattered communication uses existing RF signals to transmit data from a resource constrained device without needing to use power from a battery or power grid connection. In particular, the resource constrained device harvests energy from the existing RF carrier or other ambient signals and uses the harvested energy to broadcast a backscattered signal. Antennas on other devices can detect the backscattered signal and respond accordingly. The RF backscattered communication approach allows for resource constrained devices to communicate without being turned on or having to consume much power. The RF backscattered communication approach also allows for unpowered sensors to communicate, allowing the sensors to function in places where external power cannot be conveniently supplied.

SUMMARY

Examples are disclosed that relate to improving security of radio frequency (RF) backscattered communication. In one example, a RF device includes a primary RF signal receiver, a secondary signal receiver, a signal mixer, and a transmitter. The primary RF signal receiver is configured to receive a RF carrier signal sent from a base station. The secondary signal receiver is configured to receive a masking signal from the base station. The signal mixer is configured to generate a response signal based at least on the RF carrier signal and generate a mixed signal by mixing the response signal and the masking signal. The transmitter is configured to broadcast the mixed signal, via backscattering, as a masked backscattered signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

RF backscattered communication allows for resource constrained devices to communicate without being turned on or having to consume much power. Backscattered signals can be easily received and interpreted by proximate devices. Conventional RF backscattered communication approaches do not encrypt the data encoded in backscattered signals as such encryption can be too resource intensive to be performed by a resource constrained device. Thus, in some scenarios, backscattered signals can be received by an unintended device and the data encoded in the backscattered signals can be acquired by an unintended entity associated with the unintended device.

Accordingly, the present disclosure is directed to an RF backscattered communication approach having improved security in order to reduce the likelihood of a backscattered signal being interpreted by an unintended device. This approach leverages use of a secondary communication channel for a base station to send a masking signal to a resource constrained RF device. The resource constrained RF device mixes the masking signal with a response signal generated based at least on a received RF carrier signal to generate a mixed signal in which the data encoded in the response signal is obfuscated by the masking signal. Since the masking signal is known by the base station, the base station can recover the original response signal by filtering out the masking signal from a received masked backscattered signal.

The technical feature of obfuscating the data encoded in the response signal by mixing the response signal with the masking signal provides the technical benefit of improving security of RF backscattered communication. In particular, since the data encoded in the response signal is obfuscated by the masking signal, even if the masked backscattered signal is received by an unintended device, the unintended device would be unable to extract the data because the unintended device does not know how to filter out the masking signal from the masked backscattering signal. Further, by having the base station generate the masking signal, at least some of the processing burden is shifted away from the resource constrained device and to the base station, which is not resource constrained.

In some implementations, communication security can be further enhanced by transmitting the masking signal through a substrate that is shared by the base station and the resource constrained RF device. By transmitting the masking signal through the shared substrate, the transmission range of the secondary communication channel is localized to the shared environment of the base station and the resource constrained RF device and other RF devices outside of the shared environment are unable to receive the masking signal.

Figure 1:
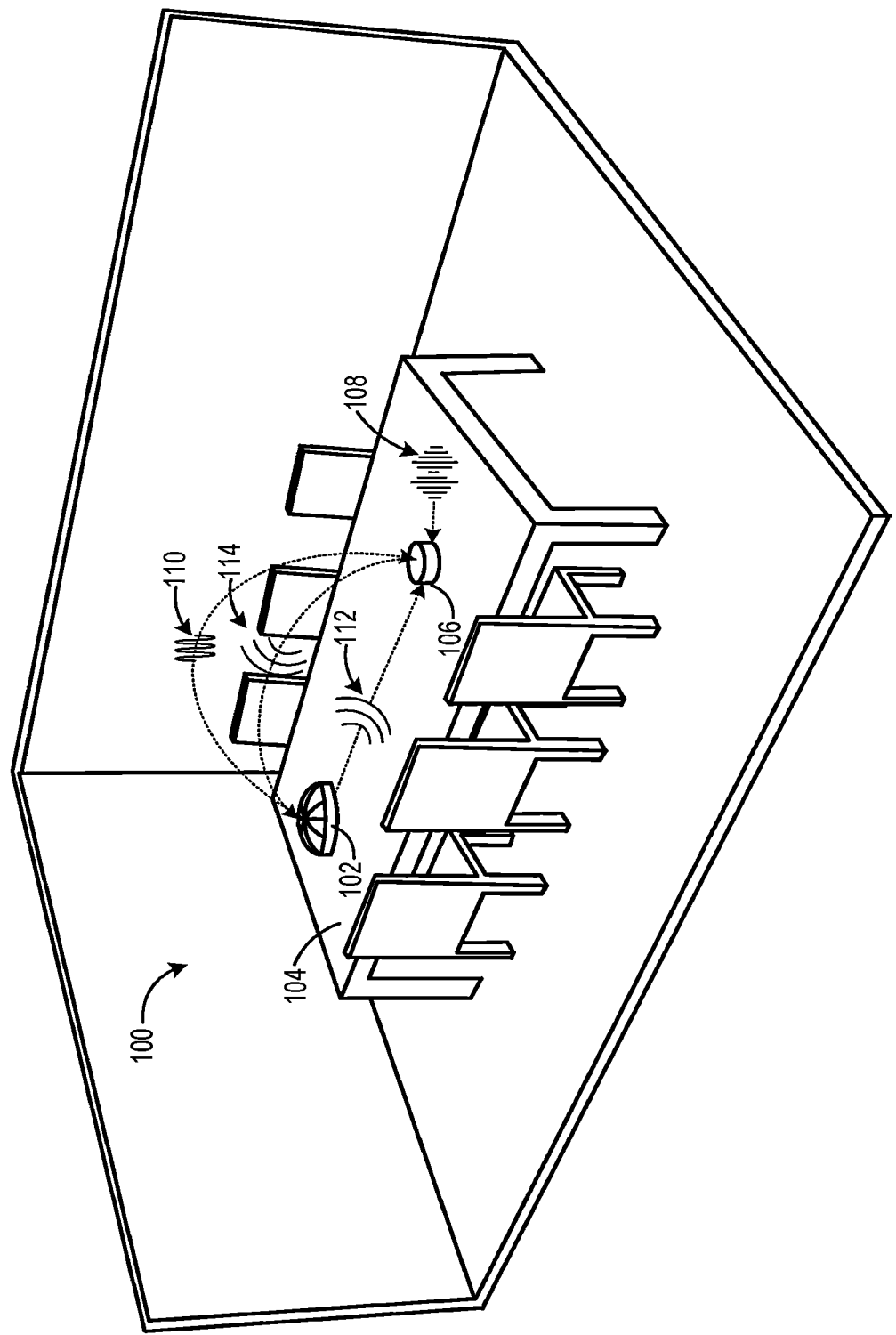
FIG. 1 shows an example use case of a resource constrained radio frequency (RF) device that employs the secure backscattered communication approach of the present disclosure to communicate with a base station.

FIG. 1 shows an example use case of a resource constrained RF device that employs the secure backscattered communication approach of the present disclosure to communicate with a base station. In this use case, an environment in the form of a conference room 100 includes a base station 102. The base station 102 is positioned on a table 104 in the conference room 100. The base station 102 provides virtual conference call functionality, such as audio/video capture and transmission. A resource constrained RF device in the form of a battery-free microphone device 106 is positioned on the table 104, such that the base station 102 and the battery-free microphone device 106 are positioned on a shared substrate—e.g., the table 104.

Figure 2:
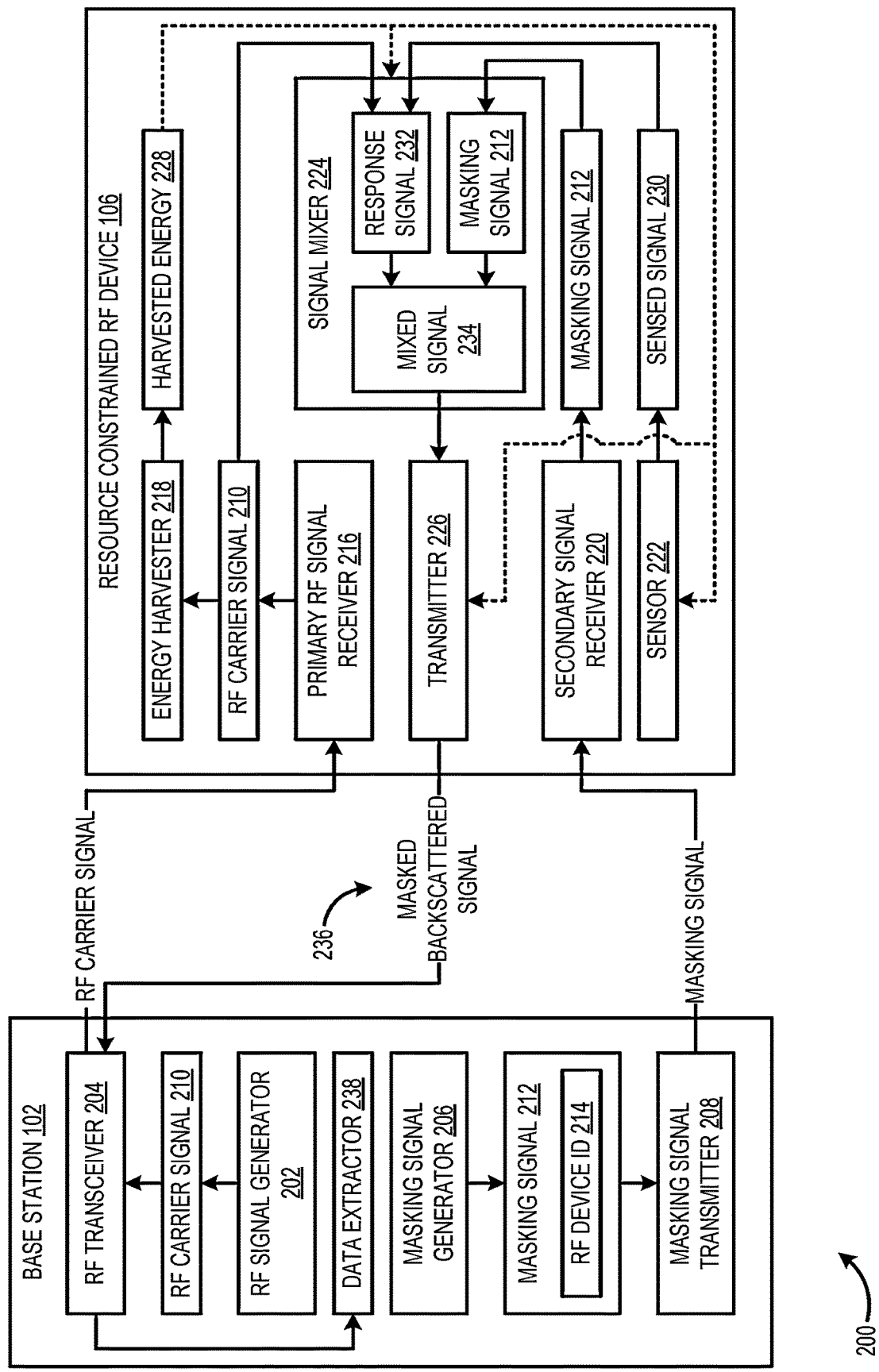
FIG. 2 schematically shows an example computing system including a resource constrained RF device of the present disclosure.

The battery-free microphone device 106 captures an ambient audio signal 108 via a microphone (which is an example of a sensor 222 shown in FIG. 2). The ambient audio signal 108 represents ambient sound (e.g., speech, background noise) in the conference room 100. The ambient audio signal 108 can be used for speech transcription, noise cancelation, speaker identification, and other virtual conference call functionality.

The battery-free microphone device 106 is referred to herein as a resource constrained device, because it operates without a dedicated power source (e.g., a battery or a connection to a power grid). In order for the battery-free microphone device 106 to function without power, the base station 102 transmits a RF carrier signal 110 that is received by the battery-free microphone device 106. The battery-free microphone device 106 harvests energy from the RF carrier signal 110 via an energy harvester 218 (shown in FIG. 2). The battery-free microphone device 106 uses the harvested energy to perform various operations including capturing the ambient audio signal 108 via the microphone.

Furthermore, the base station 102 generates and transmits a vibrational masking signal 112 through the table 104. Since the battery-free microphone device 106 is also positioned on the table 104, the battery-free microphone device 106 is capable of receiving the vibrational masking signal 112 through the table 104. By transmitting the vibrational masking signal 112 through the table 104, the transmission range of the vibrational masking signal 112 is limited to the table itself and other devices positioned beyond the table 104 that are not intended to receive the vibrational masking signal 112 cannot in fact receive the vibrational masking signal 112. Moreover, the base station 102 is less resource constrained than the battery-free microphone device 106. For example, the base station 102 may be powered by a battery or connected to a power outlet. As such, the base station 102 can shoulder more of the processing burden to generate the vibrational masking signal 112 for data obfuscation instead of the battery-free microphone device 106 having to perform such data obfuscation processing that would cause the battery-free microphone device 106 to consume additional resources.

The battery-free microphone device 106 generates a response signal based at least on the RF carrier signal 110 and the ambient audio signal 108 via a signal mixer 224 (shown in FIG. 2). The response signal encodes audio data extracted from the ambient audio signal 108. The battery-free microphone device 106 mixes the response signal with the vibrational masking signal 112 via the signal mixer 224 (shown in FIG. 2) to generate a mixed signal that obfuscates the encoded audio data using the vibrational masking signal 112. The signal mixer 224 is powered by the energy harvested from the RF carrier signal 110. The battery-free microphone device 106 broadcasts the mixed signal via a transmitter 226 (shown in FIG. 2) using the harvested energy by backscattering the masked signal as a masked backscattered signal 114. The base station 102 receives the masked backscattered signal 114 and since it generated the vibrational masking signal 112 it can filter out the vibrational masking signal 112, via a data extractor 238 (shown in FIG. 2), to recover the original response signal generated by the battery-free microphone device 106. The base station 102 uses the audio data encoded in the response signal to perform various virtual conference call functionality, such as speech transcription, noise cancelling, and speaker identification.

The use case shown in FIG. 1 and described above is one non-limiting example in which a resource constrained RF device securely communicates with a base station by broadcasting a masked backscattered signal via backscattering. Such a secure backscattered communication approach is broadly applicable to various forms of RF devices to enable communication in a secure and power efficient manner. A resource constrained RF device may take any suitable form. In some implementations, a resource constrained RF device includes a sensor configured to measure a signal. The resource constrained RF device encodes the measured signal data in a response signal that is mixed with a masking signal to generate a mixed signal that is transmitted via backscattering, as a masked backscattered signal to a base station. Note that although the battery-free microphone device 106 operates without a battery in the illustrated example, in some implementations, the battery-free microphone device 106 may include a battery or another power storage device (e.g., a super capacitor) that provides some degree of power for operation. In such implementations, the secure backscattered communication approach may facilitate power efficient communication that would prolong battery life or otherwise extend stored power.

FIG. 2 schematically shows an example computing system 200 including the base station 102 and the resource constrained RF device 106 of FIG. 1. Note that the base station 102 and the resource constrained RF device 106 can assume different forms. The base station 102 includes a RF signal generator 202, a RF transceiver 204, a masking signal generator 206, a masking signal transmitter 208, and a data extractor 238. The RF signal generator 202 is configured to generate a RF carrier signal 210. In some examples, the RF carrier signal 210 encodes information to be communicated from the base station 102 to the resource constrained RF device 106. In some examples, the base station 102 generates the RF carrier signal 210 so that the resource constrained RF device 106 can harvest energy from it to power various operations. The RF signal generator 202 can generate the RF carrier signal 210 using any suitable RF signal generation technique. The RF transceiver 204 is configured to broadcast the RF carrier signal 210. In some implementations, the base station 102 may be in communication with a plurality of resource constrained RF devices and the RF transceiver 204 broadcasts the RF carrier signal 210 for reception by the plurality of resource constrained RF devices. In some examples, the RF carrier signal 210 may encode an individualized identifier that corresponds to a particular resource constrained RF device of the plurality of resource constrained RF devices.

The masking signal generator 206 is configured to generate a masking signal 212 that can be received by the resource constrained RF device 106 to enable masked backscattered communication between the resource constrained RF device 106 and the base station 102. The masking signal 212 is configured with signal characteristics (e.g., time domain and/or frequency domain characteristics) that obfuscate data encoded in a response signal 232 generated by the resource constrained RF device 106.

The masking signal generator 206 may be configured to generate any suitable type of masking signal 212. In some implementations, the masking signal 212 is an audio signal. In some implementations, the audio signal is configured to not be audible by the human ear. In some examples, the audio signal is an ultrasonic audio signal. In some implementations, the masking signal 212 is an optical signal. In some examples, the optical signal is a non-visible wavelength range, such as infrared or near-infrared. In some examples, the optical signal has a suitably high modulation frequency to be perceived as being a solid light. In some implementations, the masking signal 212 is a vibrational signal.

In some implementations, the masking signal 212 has a limited transmission range that reduces the likelihood of the masking signal 212 being intercepted by an unintended device. In some implementations, the transmission range of the masking signal 212 may be a line of sight. For example, the transmission range of the masking signal 212 may be restricted to an enclosed environment, such as a room, shared by the base station 102 and the resource constrained RF device 106. In some implementations, the transmission range of the masking signal 212 may be limited to a substrate shared by the base station 102 and the resource constrained RF device 106. More particularly, the base station 102 and the resource constrained RF device 106 may be positioned on a shared substrate, and the masking signal 212 can be transmitted through the shared substrate.

In some implementations, the base station 102 may be in communication with a plurality of different resource constrained RF devices. In order to communicate individually with each of the different resource constrained RF devices, the masking signal generator 206 may be configured to encode an individualized RF device identifier 214 into the masking signal 212. Encoding different individualized RF device identifiers into different masking signals intended for different resource constrained RF devices provides the technical benefit of improving communication accuracy between devices. More particularly, a particular resource constrained RF device can ignore received masking signals intended for other resource constrained RF devices by checking that the individualized RF device identifier encoded in the masking signal is associated with a different resource constrained RF device.

The masking signal transmitter 208 is configured to broadcast the masking signal 212. The masking signal transmitter 208 may take any suitable form to broadcast any suitable type of masking signal. In some implementations, the masking signal transmitter 208 is an optical emitter configured to broadcast an optical masking signal. In one example, the optical masking signal includes a spatiotemporal light pattern. In some implementations, the masking signal transmitter 208 is an audio transducer configured to broadcast an audio masking signal or a vibrational masking signal. For example, the audio transducer could broadcast a vibrational masking signal through a shared substrate, such as the table 104 shown in FIG. 1 or another type of shared substrate.

The base station 102 may generate the masking signal to shift at least some of the processing burden away from the resource constrained RF device 106, since the base station 102 is less resource constrained than the resource constrained RF device 106.

The resource constrained RF device 106 includes a primary RF signal receiver 216, an energy harvester 218, a secondary signal receiver 220, a sensor 222, a signal mixer 224, and a transmitter 226. The primary RF signal receiver 216 is configured to receive the RF carrier signal 210 from the base station 102. The energy harvester 218 is configured to harvest energy 228 from the received RF carrier signal 210. In one example, the energy harvester 218 includes a nano-power buck-boost integrated circuit (IC) that is configured to harvest and buffer the harvested energy 228 in a small capacitor. In other examples, the energy harvester 218 may have a different configuration. In some implementations, the energy harvester 218 may be configured to charge a small battery with the harvested energy 228 if the battery is included in resource constrained RF device 106.

The secondary signal receiver 220 is configured to receive the masking signal 212 from the base station 102. In some implementations where the base station 102 and the resource constrained RF device 106 are positioned on a shared substrate, the secondary signal receiver 220 may be configured to receive the masking signal 212 through the shared substrate.

The sensor 222 is configured to sense a signal 230. The sensor 222 may be configured to sense any suitable type of signal 230. In some implementations, the sensor 222 is a microphone configured to sense an audio signal corresponding to ambient sounds in the environment of the computing system 200. In some implementations, the sensor 222 is configured to sense a resistive or capacitive signal. In some implementations, the sensor 222 is a temperature sensor configured to measure a temperature signal. In some implementations, the sensor 222 is a biometric sensor configured to sense a biometric signal corresponding to a physical property of a human subject (e.g., heart rate, breath rate, temperature). In some implementations, the sensor 222 is powered by the harvested energy 228 harvested by the energy harvester 218.

The signal mixer 224 is configured to generate a response signal 232 based at least on the RF carrier signal 210 to communicate information to the base station 102. In some implementations, the signal mixer 224 generates the response signal 232 based at least on information encoded in the RF carrier signal 210. In the signal mixer 224 generates the response signal 232 based at least on using the harvested energy 218 harvested from the RF carrier signal 210.

In some implementations, the signal mixer 224 is configured to receive the sensed signal 230 from the sensor 222 and generate the response signal 232 based at least on the sensed signal 230. In some examples, the signal mixer 224 maps the sensed signal 230 into a modulated frequency that is output as the response signal 232.

In some implementations, the signal mixer 224 encodes other information in the response signal 232, such as an individualized RF device identifier or other device information not derived from the sensed signal 230.

In some implementations, operation of the signal mixer 224 is powered by the harvested energy 228 harvested by the energy harvester 218. For example, the signal mixer 224 may draw the harvested energy 228 from a storage capacitor or a small battery when one or both is included in the resource constrained RF device 106.

Figure 3:
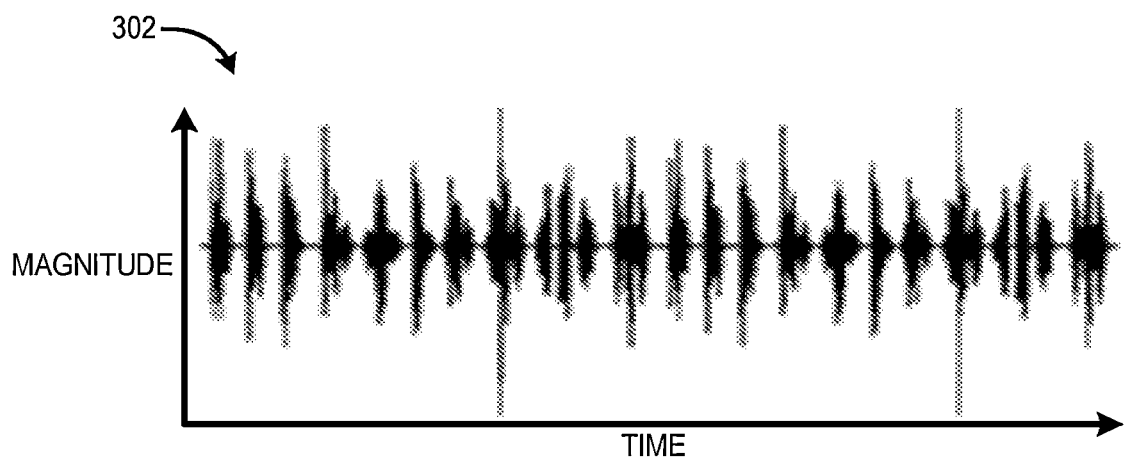
FIG. 3 shows an example response signal.
Figure 3:
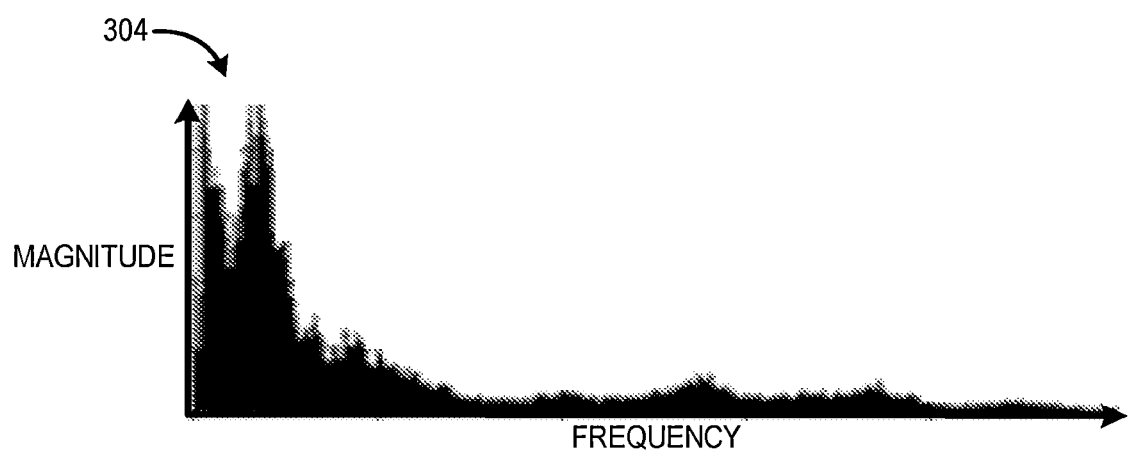

FIG. 3 shows an example response signal 300 that may be generated by the signal mixer 224 shown in FIG. 2. A time domain representation of the response signal 300 is shown at 302. A frequency domain representation of the response signal 300 is shown at 304. For example, the response signal 300 may be generated based on an audio signal captured by a microphone of the resource constrained RF device 106.

Returning to FIG. 2, the signal mixer 224 is configured to receive the masking signal 212 from the secondary signal receiver 220 and mix the masking signal 212 with the response signal 232 to generate a mixed signal 234. The masking signal 212 is designed such that, when mixed with the response signal 232, the data encoded in the mixed signal 234 is obfuscated from any device that does not have the masking signal 212 (e.g., devices other than the base station 102). In some implementations, a shape of a noise profile of the masking signal 212 is based at least on a frequency or temporal characteristic of the response signal 232. The shape of the noise profile of the masking signal 212 may be based on any suitable distribution based on the shape of the response signal 232. In one example, the shape of the noise profile of the masking signal 212 is based on a Gaussian noise distribution. In another example, the shape of the noise profile of the masking signal 212 is based on a Poisson noise distribution. The noise profile of the masking signal 212 may have any suitable shape in the time domain and/or the frequency domain to suitably obfuscate the data encoded in the response signal 232.

Figure 4:
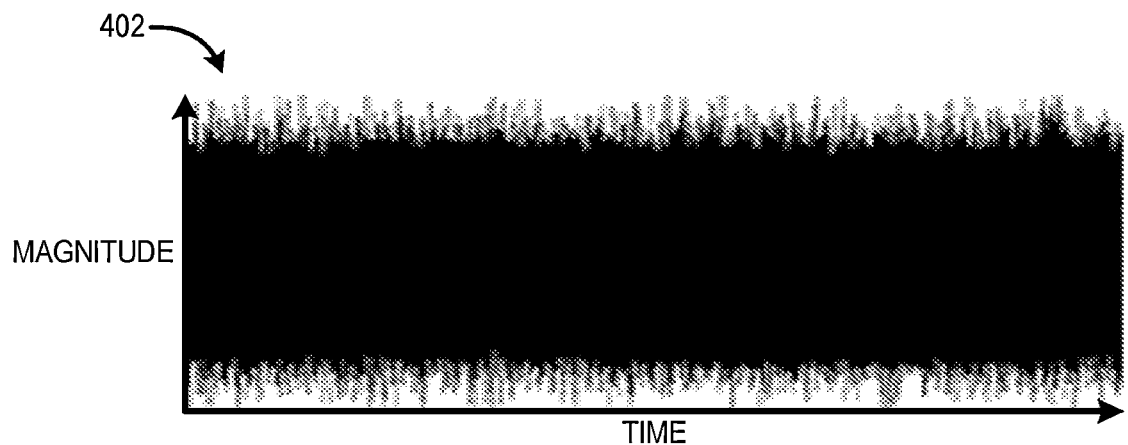
FIG. 4 shows an example masking signal.
Figure 4:
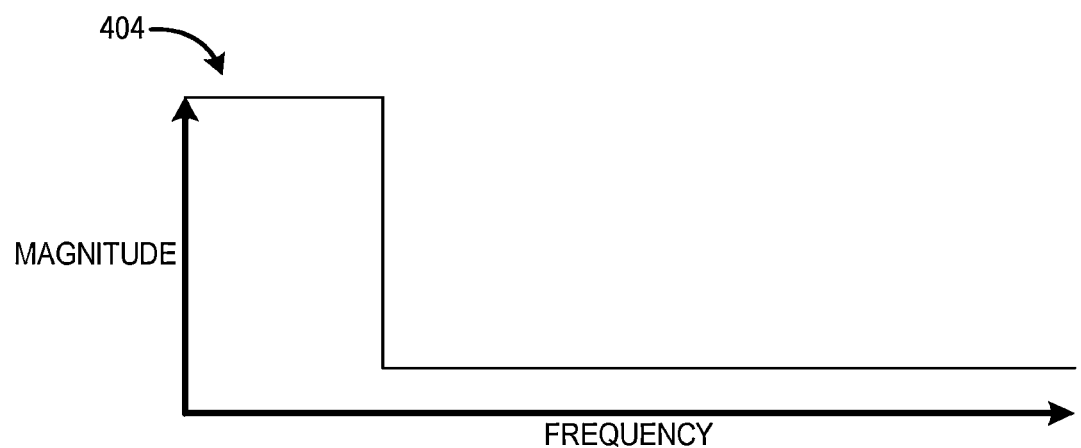

FIG. 4 shows an example masking signal that is designed to mask the data encoded in the response signal 300 shown in FIG. 3. A time domain representation of the masking signal 400 is shown at 402. A frequency domain representation of the masking signal 400 is shown at 404. Note that the shape of the noise profile of the masking signal 400 obfuscates the response signal 300 in both the time domain representation 402 and the frequency domain representation 404.

Figure 5:
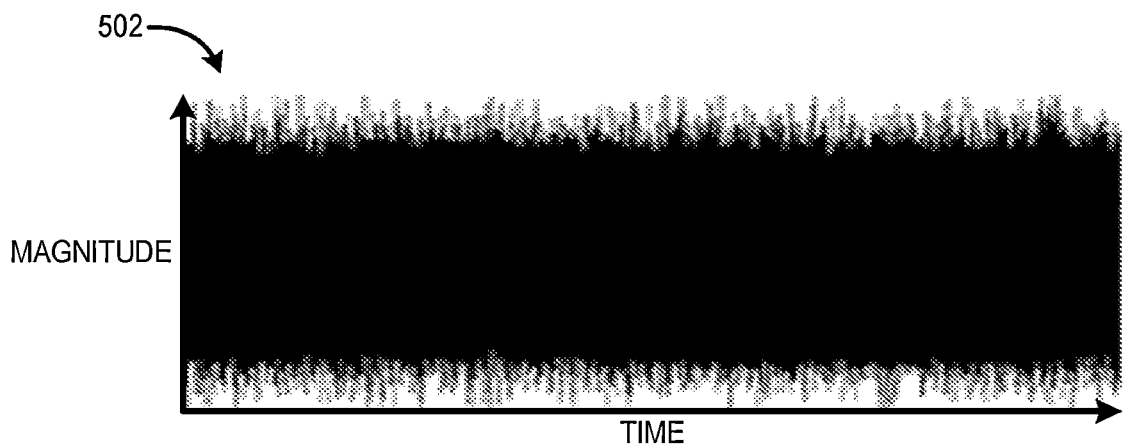
FIG. 5 shows an example mixed signal generated by mixing the response signal of FIG. 3 with the masking signal of FIG. 4.
Figure 5:
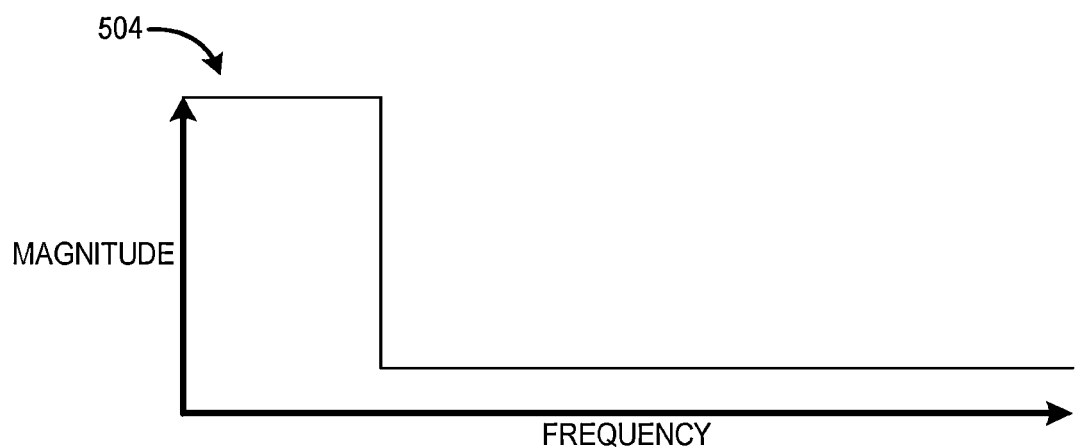

FIG. 5 shows an example mixed signal 500 generated by mixing the response signal 300 of FIG. 3 with the masking signal 400 of FIG. 4. A time domain representation of the mixed signal 500 is shown at 502. A frequency domain representation of the mixed signal 500 is shown at 504. The shape of the noise profile of the mixed signal 500 obfuscates the underlying response signal 300 in both the time domain representation 502 and the frequency domain representation 504.

Returning to FIG. 2, in some implementations, the masking signal 212 is configured to obfuscate only a part of interest of the response signal 232. The technical feature of obfuscating only the part of interest of the response signal 232 with the masking signal 212 provides the technical benefit of reducing the amount of power used to generate and transmit the mixed signal 234 as a masked backscattered signal 236. The part of interest of the response signal 232 can be determined in any suitable manner based on any suitable factors. In one example where the response signal 232 is generated based on an audio signal of ambient sounds captured by a microphone, the part of the audio signal that corresponds to human speech is the part of interest and other parts of the response signal 232 are not of interest (e.g., background noise). As such, the masking signal 212 may be configured to obfuscate the part of the response signal 232 that corresponds to the human speech. In one example, the masking signal 212 may have a noise profile that is shaped to cover the frequency range of human speech. In another example, the masking signal 212 may be temporally aligned to mask human speech identified in the response signal 232.

Figure 6:
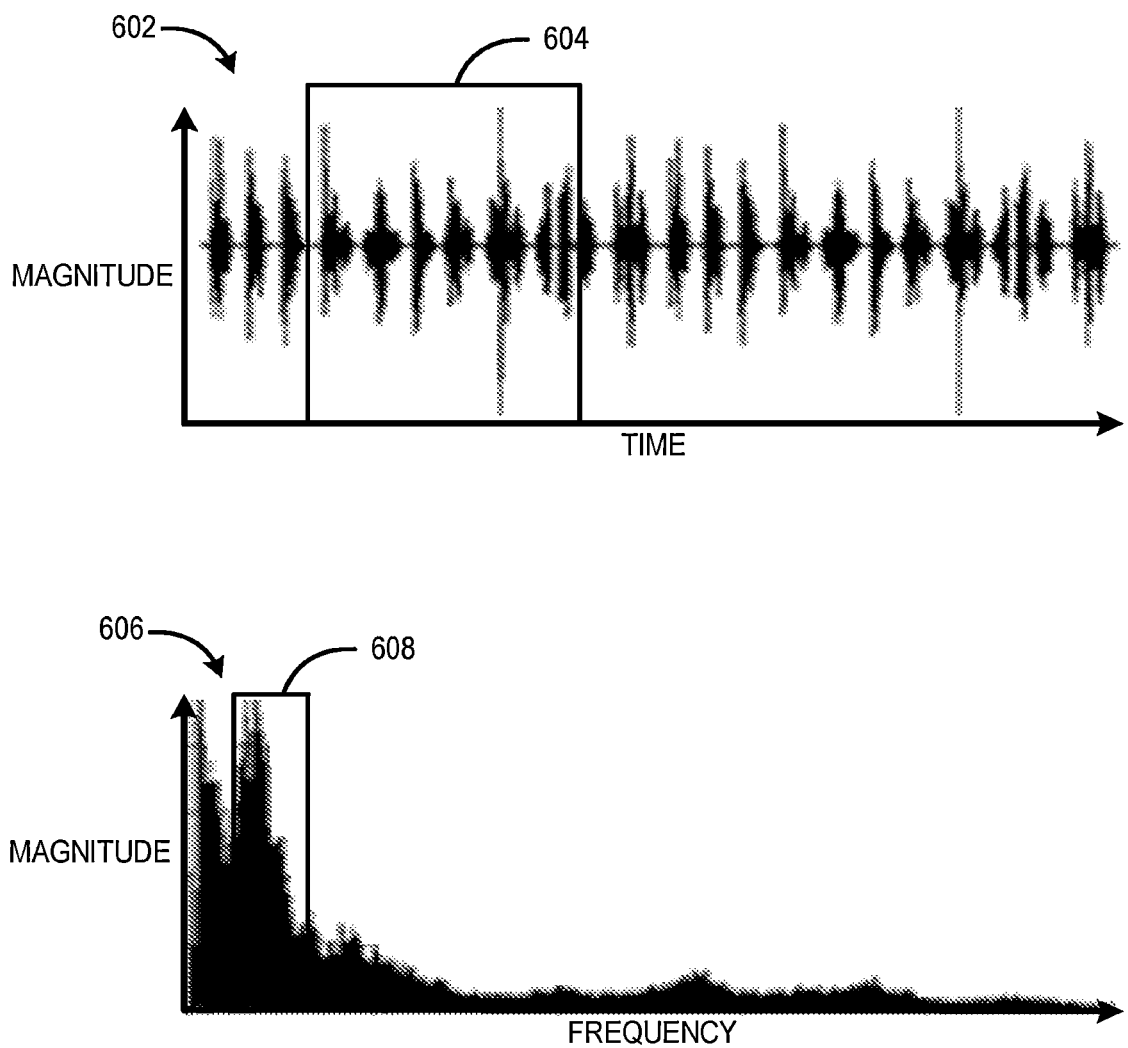
FIG. 6 shows a response signal including parts of interest that can be masked by a masking signal.

FIG. 6 shows an example response signal 600 that may be generated by the signal mixer 224 shown in FIG. 2. A time domain representation of the response signal 600 is shown at 602. A time domain part of interest of the response signal 600 is shown at 604. A frequency domain representation of the response signal 600 is shown at 606. A frequency domain part of interest of the response signal 600 is shown at 608.

Figure 7:
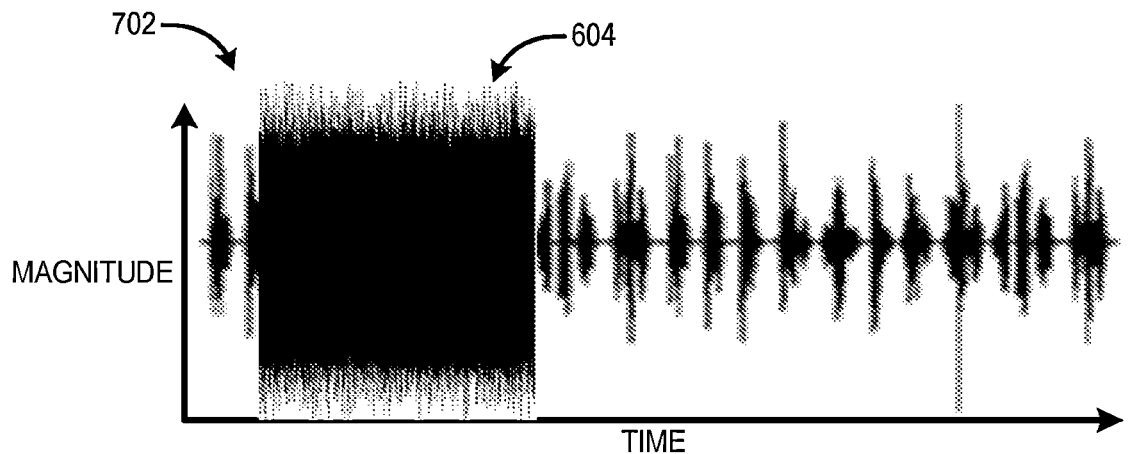
FIG. 7 shows a mixed signal that includes parts of interest that are obfuscated while other parts not of interest are left exposed.
Figure 7:
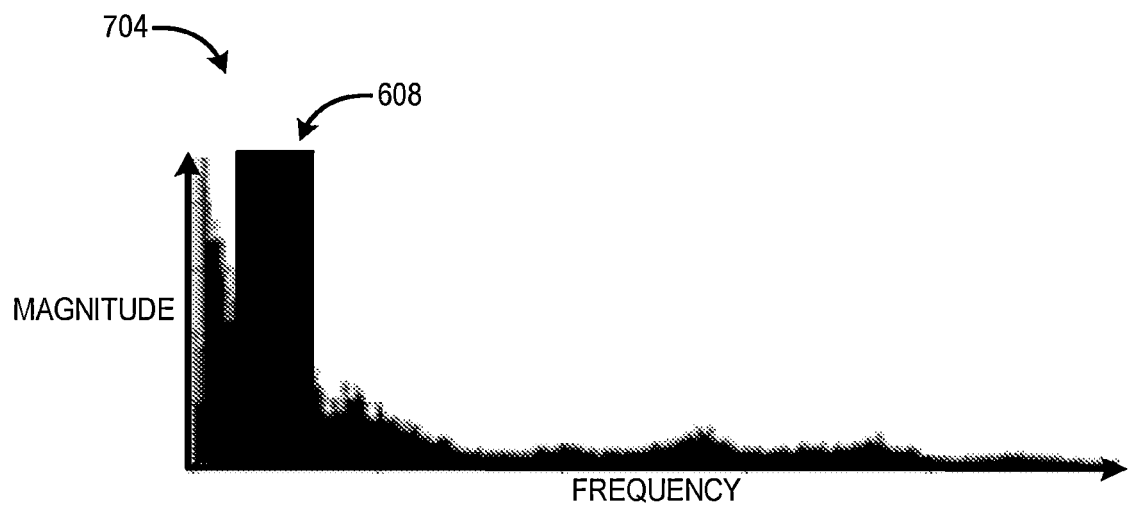

FIG. 7 shows an example mixed signal 700 that may be generated by the signal mixer 224 shown in FIG. 2 by mixing the response signal 600 shown in FIG. 6 with a masking signal to obfuscate a part of interest of the response signal 600. A time domain representation of the mixed signal 700 is shown at 702. The part of interest 604 in the time domain representation 702 of the response signal 600 is obfuscated through mixing with the masking signal. A frequency domain representation of the mixed signal 700 is shown at 704. The part of interest 608 in the frequency domain representation 704 of the response signal 600 is obfuscated through mixing with the masking signal. In the illustrated example, the masking signal obfuscates the parts of interest 604 and 608 in the time domain and the frequency domain, respectively, while leaving other parts of the response signal 600 that are not of interest exposed in the mixed signal 700. Such a signal mixing approach provides obfuscation in a manner that consumes less resources relative to an approach that masks the entire response signal.

Note that any suitable part of a response signal may be deemed of interest and obfuscated by a masking signal in a partial obfuscation approach. In some implementations, the shape of the noise profile of the masking signal may be pre-determined with the knowledge of the type of data that is being encoded in the response signal such that the masking signal obfuscates the part of interest of the response signal that includes the encoded data. In other implementations, the masking signal may be determined or shaped dynamically by the signal mixer 224 or via communication between the base station 102 and the resource constrained RF device 106 to dynamically determine one or more parts of interest of the response signal to be obfuscated.

Returning to FIG. 2, the resource constrained RF device 106 includes the transmitter 226 that is configured to broadcast the mixed signal 234, via backscattering, as a masked backscattered signal 236. In some implementations, the harvested energy 228 is supplied to the transmitter 226 to broadcast the mixed signal 234, via backscattering, as the masked backscattered signal 236. The base station 102 receives the masked backscattered signal 236 via the RF transceiver 204. The data extractor 238 is configured to receive the masked backscattered signal 236 from the RF transceiver 204 and filter out the masking signal 212 from the masked backscattered signal 236 to recover the original response signal 232 and extract the data encoded in the response signal 232. For example, the encoded data may correspond to the sensed signal 230 sensed by the sensor 222 of the resource constrained RF device 106. Returning to the example shown in FIG. 1, the encoded data includes ambient audio data within the room 100 that the base station 102 can used to provide virtual conference call functionality, such as audio/video capture and transmission, speaker identification, voice transcription, etc. In other examples, the sensor 222 may take another suitable form. In yet other examples, the data encoded in the response signal may include data generated in response to the RF carrier signal 210.

The resource constrained RF device 106 is configured to maximize sensing ability while minimizing the cost, area, and power consumption of the device. Such design considerations helps eliminate the need for a large power storage device which makes it possible to develop a small, flexible, and low-cost device.

Figure 8:
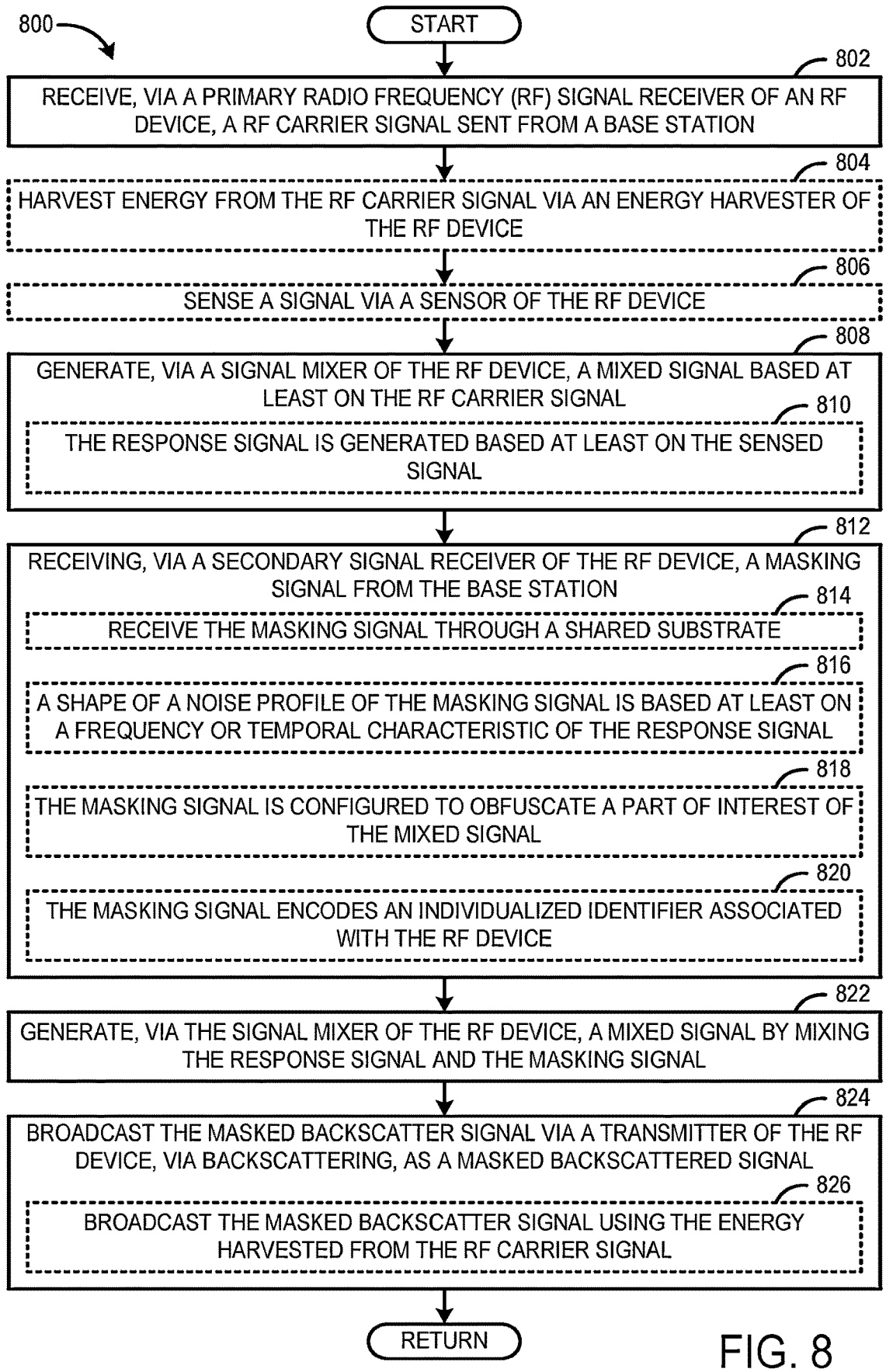
FIG. 8 is a flowchart of a secure backscattered communication method, according to one example of the present disclosure.

FIG. 8 shows an example secure backscattered communication method 800. For example, the method 800 may be performed by the resource constrained RF device 106 shown in FIGS. 1 and 2.

At 802, the method 800 includes receiving, via a primary RF signal receiver of the resource constrained RF device, a RF carrier signal sent from a base station.

In some implementations, at 804, the method 800 may include harvesting energy from the RF carrier signal via an energy harvester of the resource constrained RF device.

In some implementations, at 806, the method 800 may include sensing a signal via a sensor of the resource constrained RF device. For example, the sensor may include a microphone, a resistive sensor, a capacitive sensor, an optical sensor, a thermal sensor, or another type of sensor.

At 808, the method 800 includes generating, via a signal mixer of the resource constrained RF device, a response signal based at least on the RF carrier signal.

In some implementations, at 810, the response signal is generated bast at least on the sensed signal sensed by the sensor of the resource constrained RF device.

At 812, the method 800 includes receiving, via a secondary signal receiver of the resource constrained RF device, a masking signal from the base station.

In some implementations, at 814, the masking signal may be received through a shared substrate on which the base station and the resource constrained RF device are positioned.

In some implementations, at 816, a shape of a noise profile of the masking signal may be based at least on a frequency or temporal characteristic of the response signal.

In some implementations, at 818, the masking signal may be configured to obfuscate a part of interest of the response signal. For example, if the signal sensed by the sensor is an audio signal representing ambient sound in an environment, then the part of the audio signal that includes human speech may be of interest and obfuscated by the masking signal while the other parts of the of audio signal are left exposed.

In some implementations, at 820, the masking signal may encode an individualized identifier associated with the resource constrained RF device. The individualized identifier may communicate which resource constrained RF device the base station is attempting to communicate with when the base station is in communication with a plurality of resource constrained RF devices.

At 822, the method 800 includes generating, via the signal mixer of the resource constrained RF device, a mixed signal by mixing the response signal with the masking signal. Such mixing obfuscates the data encoded in the response signal with the masking signal.

At 824, the method 800 includes broadcasting the mixed signal via a transmitter of the resource constrained RF device, via backscattering, as a masked backscattered signal.

In some implementations, at 826, the method 800 may include broadcasting the masked backscattered signal using energy harvested from the RF carrier signal. The masked backscattered signal may be received by the base station. The base station may filter out the masking signal from the masked backscattered signal to recover the original response signal and extract the data encoded in the response signal.

The above systems and methods may be employed to provide a masking of response signals that are transmitted via backscattering, which inhibits the response signals from being received and decoded by an unintended recipient. This promotes security of communications, avoiding potential data leaks. The systems and methods described above are particularly applicable to resource constrained RF devices, as embodiments thereof can be implemented solely using energy harvested from the carrier signal, although the above systems and methods are not limited to such resource constrained devices.

In some implementations, the methods and processes described herein may be tied to a computing system of one or more computing devices. In particular, such methods and processes may be implemented as a computer-application program or service, an application-programming interface (API), a library, and/or other computer-program product.

Figure 9:
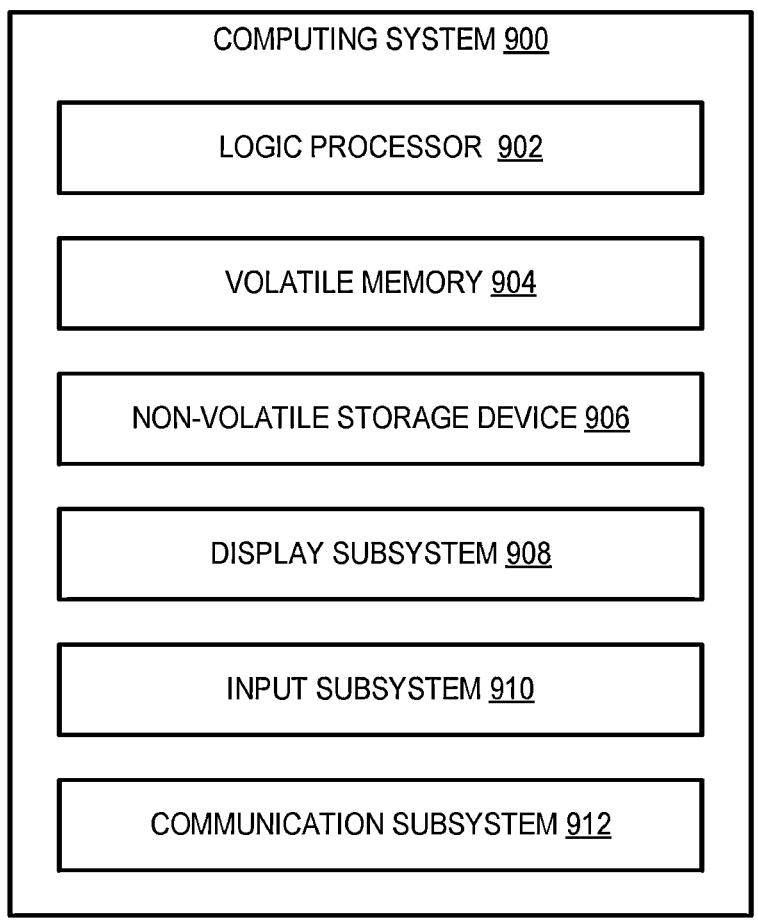
FIG. 9 schematically shows an example computing system in which the resource constrained RF device of FIG. 2 may be implemented.

FIG. 9 schematically shows a non-limiting implementation of a computing system 900 that can enact one or more of the methods and processes described above. Computing system 900 is shown in simplified form. Computing system 900 may embody the base station 102 and the resource constrained RF device 106 shown in FIGS. 1 and 2. Computing system 900 may take the form of one or more communication devices, personal computers, server computers, tablet computers, network computing devices, game consoles, mobile computing devices, mobile communication devices (e.g., smart phone), wearable computing devices such as wearable sensors, smart wristwatches and head mounted augmented reality devices, Internet of Things (IoT) devices, and/or other computing devices.

Computing system 900 includes a logic processor 902, volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 900 to send and/or receive messages to and/or from other devices via a network such as the Internet.

In one example a radio frequency (RF) device, comprises a primary RF signal receiver configured to receive a RF carrier signal sent from a base station, a secondary signal receiver configured to receive a masking signal from the base station, a signal mixer configured to generate a response signal based at least on the RF carrier signal and generate a mixed signal by mixing the response signal and the masking signal, and a transmitter configured to broadcast the mixed signal, via backscattering, as a masked backscattered signal. In this example and/or other examples, the masking signal may be an audio signal. In this example and/or other examples, the masking signal may be an optical signal. In this example and/or other examples, the masking signal may be a vibrational signal. In this example and/or other examples, the RF device may further comprise a sensor configured to sense a signal, and wherein the signal mixer is configured to generate the response signal based at least on the sensed signal. In this example and/or other examples, the sensed signal may be an audio signal. In this example and/or other examples, the sensed signal may be a resistive or capacitive signal. In this example and/or other examples, the RF device and the base station may be positioned on a shared substrate, and the masking signal may be transmitted through the shared substrate. In this example and/or other examples, the RF may further comprise an energy harvester configured to harvest energy from the RF carrier signal, the harvested energy may be supplied to the transmitter to broadcast the masked backscattered signal. In this example and/or other examples, a shape of a noise profile of the masking signal may be based at least on a frequency or temporal characteristic of the response signal. In this example and/or other examples, the masking signal may be configured to obfuscate a part of interest of the response signal. In this example and/or other examples, the masking signal may encode an individualized identifier associated with the RF device.

In another example, a method comprises receiving, via a primary RF signal receiver of an RF device, a RF carrier signal sent from a base station, receiving, via a secondary signal receiver of the RF device, a masking signal from the base station, generating, via a signal mixer of the RF device, a response signal based at least on the RF carrier signal, generating, via the signal mixer of the RF device, a mixed signal by mixing the response signal and the mixed signal, and broadcasting the mixed signal via a transmitter of the RF device, via backscattering, as a masked backscattered signal. In this example and/or other examples, the method may further comprise sensing, via a sensor, a signal, and the response signal may be generated based at least on the sensed signal. In this example and/or other examples, the method may further comprise harvesting energy from the RF carrier signal via an energy harvester, and the harvested energy may be supplied to the transmitter to broadcast the masked backscattered signal. In this example and/or other examples, the RF device and the base station may be positioned on a shared substrate, and the masking signal may be transmitted through the shared substrate. In this example and/or other examples, a shape of a noise profile of the masking signal may be based at least on a frequency or temporal characteristic of the response signal. In this example and/or other examples, the masking signal may be configured to obfuscate a part of interest of the response signal. In this example and/or other examples, the masking signal may encode an individualized identifier associated with the RF device.

In yet another example, a battery-free RF device, comprises a primary RF signal receiver configured to receive a RF carrier signal sent from a base station positioned on a shared substrate with the battery-free RF device, an energy harvester configured to harvest energy from the RF carrier signal, a secondary signal receiver configured to receive a masking signal from the base station through the shared substrate, a signal mixer configured to generate a response signal based at least on the RF carrier signal and generate a mixed signal by mixing the response signal and the masking signal, and a transmitter configured to broadcast the mixed signal, via backscattering, as a masked backscattered signal using the energy harvested from the RF carrier signal.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A radio frequency (RF) device, comprising:
a primary RF signal receiver configured to receive a RF carrier signal sent from a base station;
a secondary signal receiver configured to receive a masking audio signal from the base station;
a signal mixer configured to generate a response signal based at least on the RF carrier signal and generate a mixed signal by mixing the response signal and the masking audio signal; and
a transmitter configured to broadcast the mixed signal, via backscattering, as a masked backscattered signal.

2. The RF device of claim 1, further comprising:
a sensor configured to sense a signal, and wherein the signal mixer is configured to generate the response signal based at least on the sensed signal.

3. The RF device of claim 2, wherein the sensed signal is an audio signal.

4. The RF device of claim 2, wherein the sensed signal is a resistive or capacitive signal.

5. The RF device of claim 1, wherein the RF device and the base station are positioned on a shared substrate, and wherein the masking audio signal is transmitted through the shared substrate.

6. The RF device of claim 1, further comprising:
an energy harvester configured to harvest energy from the RF carrier signal, wherein the harvested energy is supplied to the transmitter to broadcast the masked backscattered signal.

7. The RF device of claim 1, wherein a shape of a noise profile of the masking audio signal is based at least on a frequency or temporal characteristic of the response signal.

8. The RF device of claim 1, wherein the masking audio signal is configured to obfuscate a part of interest of the response signal.

9. The RF device of claim 1, wherein the masking audio signal encodes an individualized identifier associated with the RF device.

10. A method comprising:
receiving, via a primary RF signal receiver of an RF device, a RF carrier signal sent from a base station;
receiving, via a secondary signal receiver of the RF device, a masking audio signal from the base station;
generating, via a signal mixer of the RF device, a response signal based at least on the RF carrier signal;
generating, via the signal mixer of the RF device, a mixed signal by mixing the response signal and the masking audio signal; and
broadcasting the mixed signal via a transmitter of the RF device, via backscattering, as a masked backscattered signal.

11. The method of claim 10, further comprising:
sensing, via a sensor, a signal, and wherein the response signal is generated based at least on the sensed signal.

12. The method of claim 10, further comprising:
harvesting energy from the RF carrier signal via an energy harvester, and wherein the harvested energy is supplied to the transmitter to broadcast the masked backscattered signal.

13. The method of claim 10, wherein the RF device and the base station are positioned on a shared substrate, and wherein the masking audio signal is transmitted through the shared substrate.

14. The method of claim 10, wherein a shape of a noise profile of the masking audio signal is based at least on a frequency or temporal characteristic of the response signal.

15. The method of claim 10, wherein the masking audio signal is configured to obfuscate a part of interest of the response signal.

16. The method of claim 10, wherein the masking audio signal encodes an individualized identifier associated with the RF device.

17. A battery-free RF device, comprising:
a primary RF signal receiver configured to receive a RF carrier signal sent from a base station positioned on a shared substrate with the battery-free RF device;
an energy harvester configured to harvest energy from the RF carrier signal;
a secondary signal receiver configured to receive a masking audio signal from the base station through the shared substrate;
a signal mixer configured to generate a response signal based at least on the RF carrier signal and generate a mixed signal by mixing the response signal and the masking audio signal; and
a transmitter configured to broadcast the mixed signal, via backscattering, as a masked backscattered signal using the energy harvested from the RF carrier signal.

* * * * *